(12) United States Patent
Schellhase et al.

(10) Patent No.: US 6,296,444 B1
(45) Date of Patent: Oct. 2, 2001

(54) PROP ROTOR HUB

(75) Inventors: Ernst C. Schellhase, Fort Worth; Willem Broekhuizen, Arlington, both of TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/410,640

(22) Filed: Oct. 1, 1999

(51) Int. Cl.⁷ .................................................. B64C 27/33
(52) U.S. Cl. ...................... 416/134 A; 416/141; 416/230; 416/244 R; 464/71; 464/83; 464/85; 464/904
(58) Field of Search ................................ 416/134 A, 141, 416/230, 244 R, 244 D, 241 A; 464/81, 83, 85, 89, 106, 147, 71, 904

(56) References Cited

U.S. PATENT DOCUMENTS

| | | | |
|---|---|---|---|
| 3,967,918 | * 7/1976 | Mouille et al. | 416/141 |
| 4,012,169 | * 3/1977 | Mouille et al. | 416/134 A |
| 4,021,141 | 5/1977 | Watson . | |
| 4,037,988 | 7/1977 | Laird . | |
| 4,077,233 | * 3/1978 | Hornig et al. | 464/89 |
| 4,099,892 | 7/1978 | Martin . | |
| 4,203,709 | 5/1980 | Watson . | |
| 4,232,563 | * 11/1980 | Peterson et al. | 416/141 |
| 4,247,255 | * 1/1981 | De Rosa | 416/141 |
| 4,293,276 | 10/1981 | Brogdon et al. . | |
| 4,427,340 | * 1/1984 | Metzger et al. | 416/141 |
| 4,430,045 | 2/1984 | Cresap . | |
| 4,516,955 | * 5/1985 | Worner et al. | 464/89 |
| 4,541,777 | 9/1985 | Sampatacos . | |
| 4,549,850 | 10/1985 | Vincent . | |
| 4,564,336 | 1/1986 | Sampatacos . | |
| 4,650,401 | 3/1987 | Yao et al. . | |
| 4,714,409 | 12/1987 | Denison et al. . | |
| 4,729,753 | 3/1988 | Neathery et al. . | |
| 4,734,081 | 3/1988 | Neathery et al. . | |
| 4,804,352 | 2/1989 | Schmidt . | |
| 5,059,094 | * 10/1991 | Robinson et al. | 416/134 A |
| 5,186,686 | 2/1993 | Staples et al. . | |
| 5,215,502 | 6/1993 | Neathery et al. . | |
| 5,263,821 | 11/1993 | Noehren et al. . | |
| 5,286,167 | 2/1994 | Byrnes et al. . | |
| 5,297,934 | 3/1994 | Desjardins . | |
| 5,358,381 | 10/1994 | Covington et al. . | |
| 5,474,424 | 12/1995 | Bietenhader et al. | 416/134 A |

FOREIGN PATENT DOCUMENTS

| | | | |
|---|---|---|---|
| 2457417 | * 1/1981 | (FR) | 416/141 |
| 6-270893 | * 9/1994 | (JP) | 416/204 R |

* cited by examiner

Primary Examiner—Christopher Verdier
(74) Attorney, Agent, or Firm—Kenneth C. Hill; James E. Walton; Hill & Hunn LLP

(57) ABSTRACT

A prop rotor hub includes a constant velocity joint in the same plane as a prop blade yoke. Torque is transmitted from a shaft to the blades through the CV joint, hub plates attached to the CV joint, and the yoke, which is attached to the hub plates. Providing all elements in a substantially planar arrangement results in a hub assembly which has significantly less height than a traditional design. The hub itself is in-plane with the yoke, resulting in a more efficient torque transmission from the mast to the rotor.

19 Claims, 5 Drawing Sheets

PROP ROTOR HUB

BACKGROUND OF THE INVENTION

1. Field of the invention The present invention relates generally to aircraft rotors, and more particularly to a hub suitable for use with a tilt rotor aircraft.

2. Description of the Prior Art

Design of rotors and propellers for aircraft is often extremely complex. A large number of factors must be taken into account, including flexure of the rotor under heavy loads and the required motions of the rotor blades with respect to the drive mechanism. The considerations for prop rotors, used as both propellers and rotors in aircraft such as a tiltrotor aircraft, can be more complex than usual.

Constant velocity joints must be provided between the rotor shaft and the blades, giving rise to a relatively complex assembly at the hub of the rotor shaft. An example of such an assembly, useful for certain helicopter designs, is described in U.S. Pat. No. 4,729,753. As illustrated therein, numerous approaches to making helicopter and prop rotor assemblies have been tried. Many of these are suitable for a given application, but not for others. As aircraft designs progress, the hub assemblies used on their rotors must meet new specifications which render older designs unsuitable.

The advent of the tilt rotor aircraft has added performance requirements to the hub assembly, resulting from the more complex operation of the craft. The prop systems on a tilt rotor are very large by comparison with standard aircraft, and size becomes an issue. In some designs of a tilt rotor aircraft, particularly suitable for use in light and medium duty models, certain design choices must be made in order that there is simply room for all of the required parts.

Standard rotor hub designs are relatively large, influencing the design of mechanical systems associated with the rotor. For example, a large rotor hub requires a relatively long mast. The hub itself is heavy, and associated systems, such as the control rods, are relatively long and heavy. Systems must be designed so that the control system is not interfered with.

Therefore, it would be desirable to provide a rotor hub design which is suitable for use with the design constraints of a prop rotor aircraft. Such hub must provide proper support for the blades while remaining small compared to prior art designs. A thinner hub design would shorten the mast, lower the height of the associated systems, and save weight.

SUMMARY OF THE INVENTION

Therefore, in accordance with the present invention, a prop rotor hub includes a constant velocity joint in the same plane as a prop blade yoke. Torque is transmitted from a shaft to the blades through the CV joint, hub plates attached to the CV joint, and the yoke, which is attached to the hub plates. Providing all elements in a substantially planar arrangement results in a hub assembly which has significantly less height than a traditional design. The hub itself is in-plane with the yoke, resulting in a more efficient torque transmission from the mast to the rotor.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The description which follows is directed to a prop rotor hub assembly suitable for use in a tilt rotor aircraft. The preferred assembly carries three blades. It will be appreciated by those skilled in the art that the described design could be used with a helicopter if desired, or that a different number of blades could be used if the design was otherwise suitable.

Figure 1:
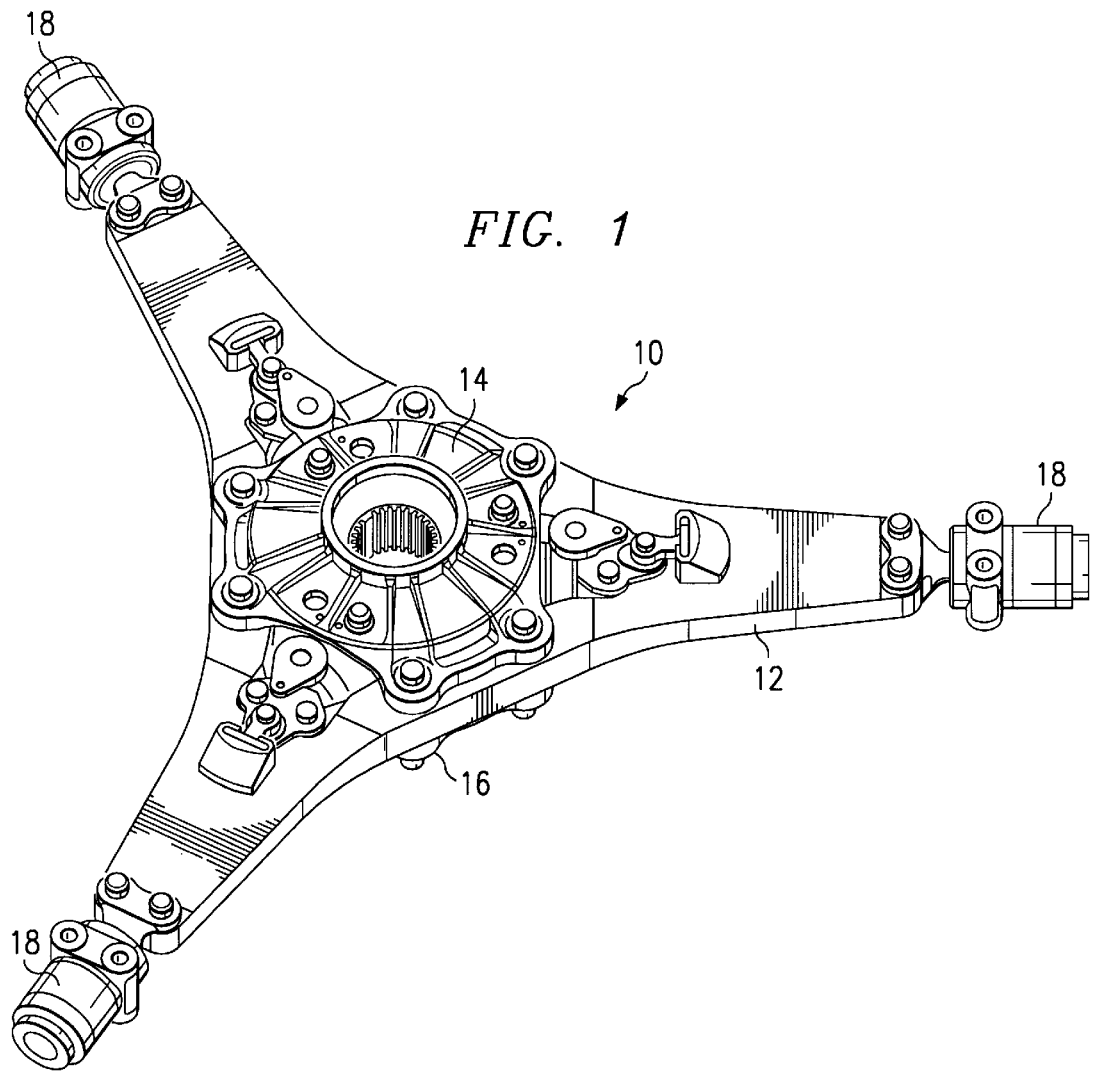
FIG. 1 is a perspective view of a preferred rotor hub assembly according to the present invention.

Referring to FIG. 1, a hub assembly 10 is shown which provides a constant velocity (CV) joint suitable for use with a tilt rotor aircraft. As will be appreciated by the following description, the described assembly provides a stiff in-plane rotor. In the preferred embodiment, the assembly is constant velocity up to approximately 12 degrees of flap, including approximately ½ degree of yoke flexure. The stiff in-plane design provides for no lead/lag flexure.

The assembly includes a yoke 12, and upper 14 and lower 16 hub plates. Details of these sub-assemblies are described in connection with FIGS. 2–6. Attached to the ends of the yoke arms are centrifugal force bearings 18. Bearings 18 include a pitch bearing internally, and absorb chord and beam loads generated by the blades (not shown) as well as centrifugal force loads. These CF bearings are well known in the art, and any suitable structures may be used.

Figure 2:
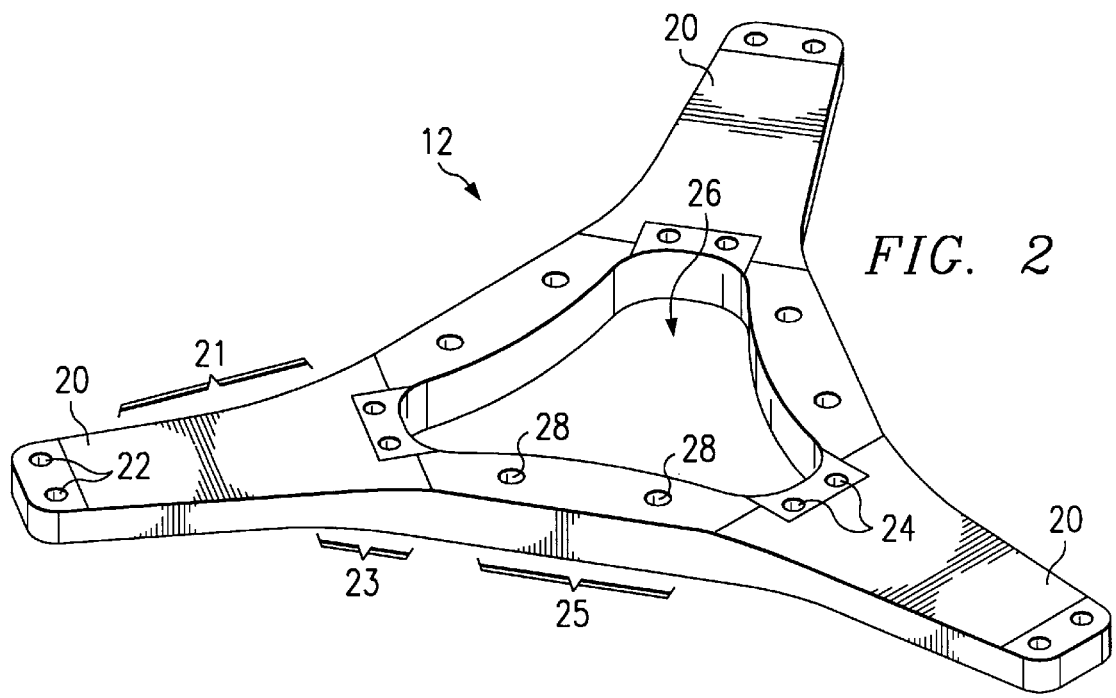
FIG. 2 is a view of a yoke used in the preferred rotor hub assembly.

FIG. 2 illustrates a yoke for the hub assembly 10. Yoke 12 has three arms 20. At the tip of each arm 20 are a pair of through holes 22 to which the CF bearings 18 are bolted. At an inboard end of each arm 20 are a pair of through holes 24 for mounting a carrier for an inboard spindle. More details of this structure are described in connection with FIG. 6.

As can be seen from FIG. 2, the center region 26 of yoke 12 is cut away. As will be described, a constant velocity joint assembly is located in center region 26 when the hub 10 is assembled. Alongside center region 26, between arms 20, are pairs of through holes 28. Holes 28 receive bolts which connect the upper and lower hub plates 14, 16 to yoke 12.

Chord stiffness for the assembly is very important. As shown in FIG. 2, chord stiffness is the resistance to bending in the plane of the yoke. The depicted design enhances such stiffness in several ways. First, the fiberglass material itself is quite stiff, particularly when laid up in the preferred manner described below. Second, the shape of the yoke is selected to maximize stiffness. Finally, the positioning of bolt holes enhances yoke stiffness.

Each arm 20 has a flexure region 21 which is somewhat flat and wide. This allows a small amount of needed flexure in a vertical direction caused by normal forces on the rotor blades. However, flexure regions 21 have less flex in the plane of the yoke 12. Transition regions 23 on each arm 20 connect the relatively thinner flexure regions 21 with thicker central support regions 25. As the arms 20 tend to flex relative to each other in12 plane, large bending forces are generated in the central support regions. These therefore need to be thicker than the flexure regions 21 to withstand these higher forces.

In addition, spacing of bolt holes 28 significantly impacts the overall in-plane stiffness of the assembly. When upper and lower plates 14, 16 are bolted together, bolts go through bolt holes 28. This provides locations of relative immobility within central support regions 25. The spacing of these holes contributes greatly to the overall stiffness of the yoke. The fact that such spacing can be varied to change the overall stiffness of the hub assembly enhances the utility of the design.

Fiberglass yoke 12 is made in expensive, permanent tooling. However, bolt holes 28 are drilled into the yoke 12 after fabrication, so their spacing can be adjusted without changing the yoke tooling. If design considerations change, adjustments to yoke stiffness can be made by adjusting spacing rather than re-working the yoke fabrication tooling. Relatively large changes in assembly stiffness can be made with relatively small spacing changes in bolt hole 28 location.

Figure 8:
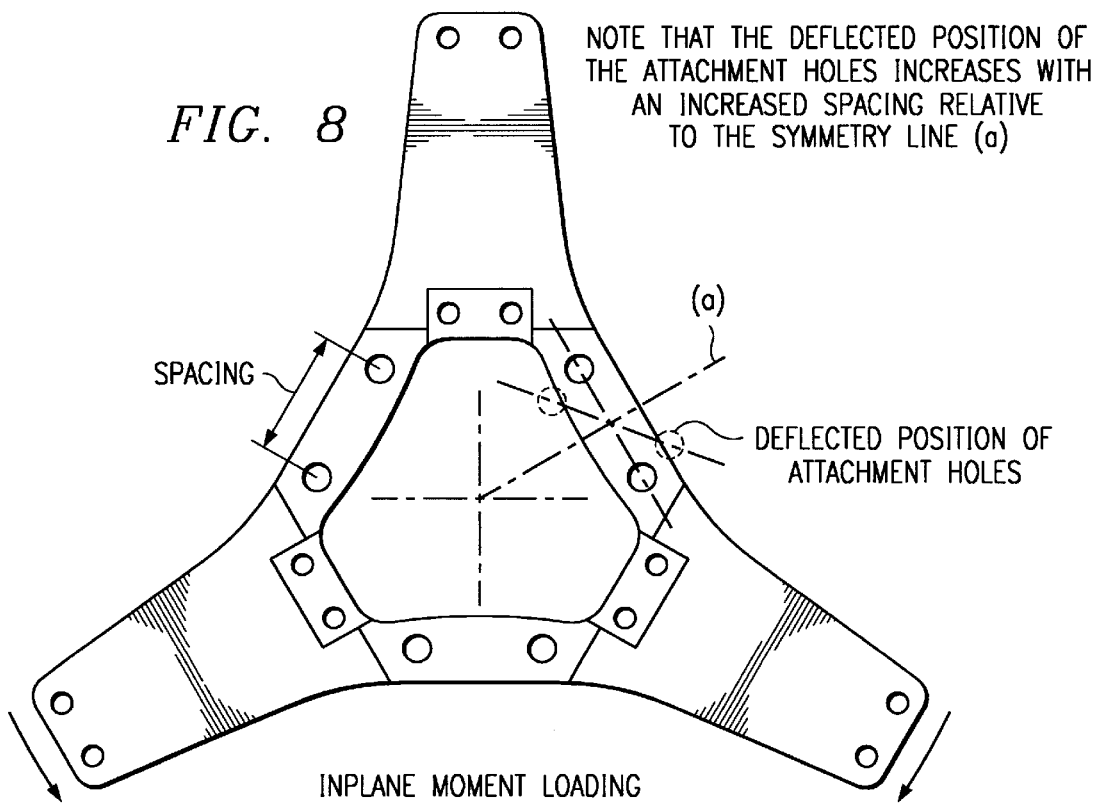
FIG. 8 is a top view of a yoke illustrating the effects of bolt hole spacing on yoke stiffness.

The geometry of yoke 12 allows the assembly stiffness to be varied by moving bolt holes 28. The opening 26 and the overall layout of yoke 12 provides a generally triangular structure, with central support regions 25 being the sides of the triangle. The triangular shape itself provides considerable in-plane stiffness, and the in-plane deflection of the side beams of the triangular center section of the yoke can be used as a means of varying the beam stiffness of the overall hub assembly. As shown in FIG. 8, locating the bolts in approximately the middle of the sides of the triangle greatly enhances overall assembly stiffness because the greatest amount of flexing naturally occurs there. Thus, the geometrical design of the yoke, in combination with the design of the overall hub assembly, hub plates, and arms, makes the assembly stiff and tunable. For example, with the illustrated design, assuming each arm 20 to be approximately 20 inches long and 2–4 inches thick, chord stiffness (EIc) of the overall assembly as described herein might be 450 lb-in$^2$ for a bolt hole 28 spacing of 3 inches. Changing the hole 28 spacing to 6 inches can increase assembly chord stiffness to over 650 lb-in$^2$ without making any other changes to the yoke 12. This large variation allows fine tuning of hole location spacing to give a desired stiffness consistent with other design considerations.

Figure 7:
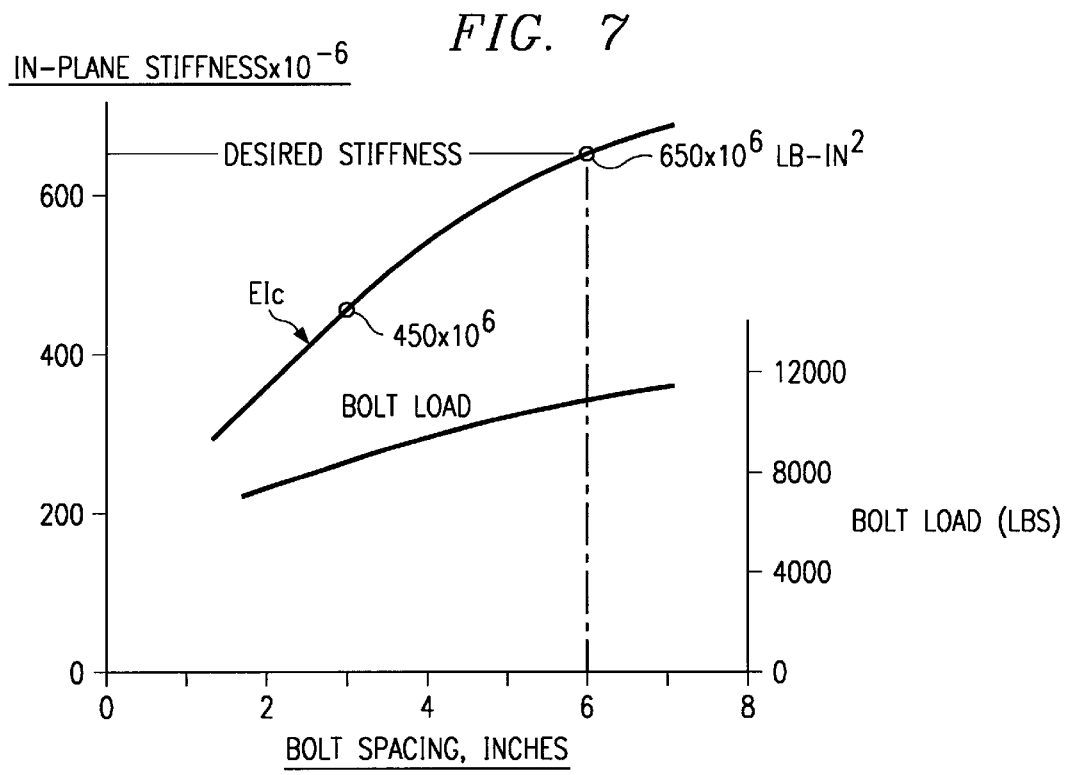
FIG. 7 is a graph illustrating loads on the rotor hub assembly.

A graph showing variations of chord stiffness as a function of bolt spacing is shown in FIG. 7. Curve EIc shows that spacing of the bolt holes 28, without changing other design factors other than those needed to accommodate the spacing change, greatly influences the overall assembly stiffness. The Bolt Load line indicates that load on the bolts increases with stiffness in a manner tracking stiffness. Curves such as those in FIG. 7 can be generated using finite element modeling of the assembly.

Figure 3:
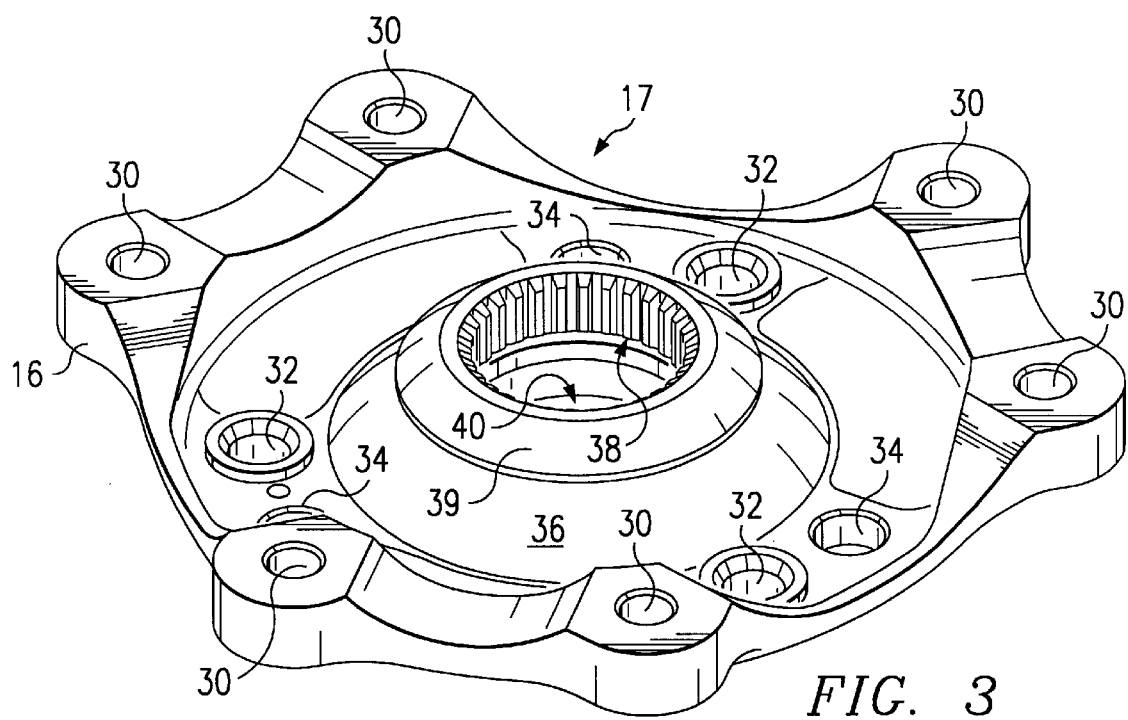
FIG. 3 is a perspective view oi a lower hub spring assembly for the preferred rotor hub assembly.
Figure 4:
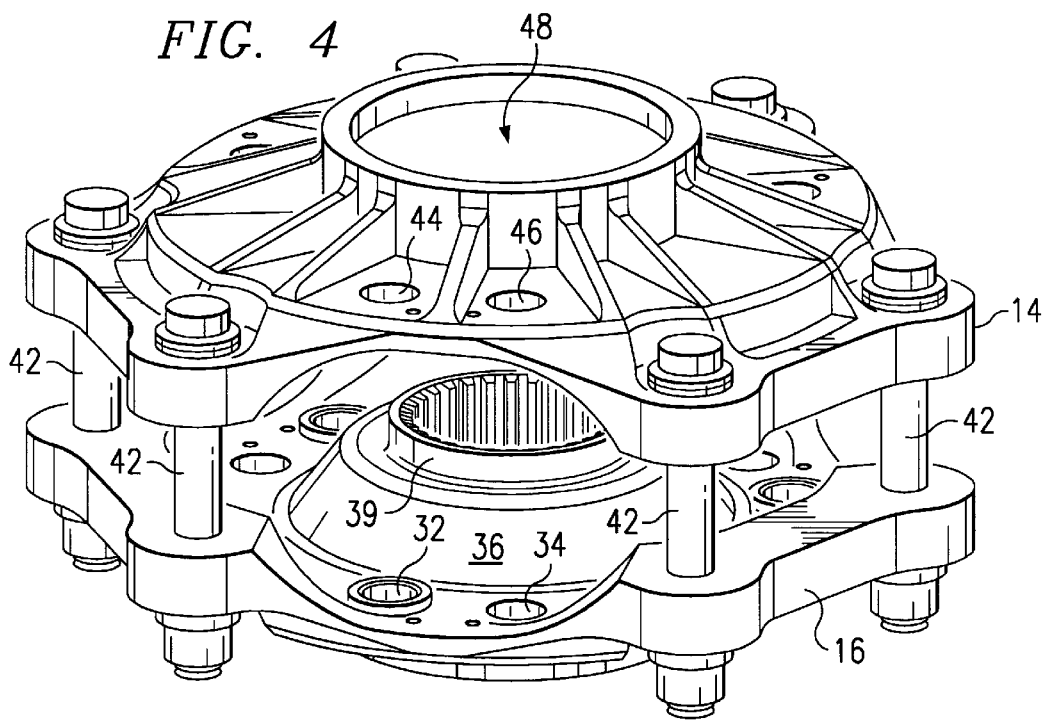
FIG. 4 shows the upper and lower hub spring assemblies connected together into a hub spring set.

As will be appreciated from the description of the hub plate spring assemblies and hub plates which is detailed in connection with FIGS. 3 and 4, changing the location of bolt holes 28 affects the size and construction of the hub plates 14, 16. As the holes 28 are moved further apart, hub plates 14, 16 must be made larger. Moving holes 28 closer together allows smaller hub plates 14, 16 to be used. Because changing the size of hub plates 14, 16 changes their weight, trade offs must be made regarding bolt hole location. The holes 28 should be far enough apart to provide enough stiffness for the overall hub assembly 10, but preferably no farther than required. Although increasing the hole spacing beyond that required increases assembly stiffness, it also increases the weight and size of the assembly. Additionally, increasing spacing increases the loads seen by the bolts, which must be large enough to withstand increased loads with increased spacing.

As is known in the art, the entire rotational assembly has a lowest resonant frequency which is a function of size, weight, stiffness and similar material properties of the rotational assembly elements. One acceptable design criterion is to provide an assembly having a lowest resonant frequency which is at least 1.25 time greater than the rotational frequency of the rotating assembly. Increasing stiffness of the hub assembly by positioning the holes 28 can be used to achieve this design criterion. Because increasing stiffness also increases weight, because of larger hub plates 14, 16, computerized finite element analysis is preferably used to optimize stiffness of hub assembly 10 to reach the target assembly stiffness. As known in the art, several iterations are generally needed in the analysis process to provide a minimal size and weight hub assembly which is stiff enough to meet design criteria. FIG. 3 shows a lower hub spring assembly 17. Assembly 17 includes the lower hub plate 16, hub spring 36, and spherical center element 39. Through holes 30 are spaced to align with holes 28 in the yoke 12. Bushings (not shown) are inserted in through holes 30 when the lower and upper hub assemblies are assembled. Through holes 32, 34 are used to receive pillow block studs described in connection with FIG. 5. Only one set of holes 32 or 34 is used during hub assembly, depending on whether the hub is used with a clockwise or counterclockwise rotating shaft.

Hub spring 36 is securely mounted on hub plate 16, preferably being glued or vulcanized to both hub plate 16 and center element 39. Hub spring 36 is preferably constructed from layers of rubber and shims as well known in the art. Construction of hub spring 36, and its mating with the prop shaft (not shown) is conventional. Center element 39 contains a plurality of splines in a central shaft opening 40 for mating with the prop shaft. Referring to FIG. 4, upper and lower hub plates 14, 16 are shown mated without yoke 12. Bolts 42 attach the hub plates 14, 16 together through holes 30 in lower hub plate 16, and matching holes in upper hub plate 14. As previously described, bushings are used to mate the hub plates 14, 16 to the bolts.

Upper hub plate 14 has through holes 44, 46 which align and correspond to through holes 32 and 34, respectively. Upper hub plate 14 includes a hub spring (not shown) corresponding to hub spring 36, and a spherical center element corresponding to center element 39 of the lower hub spring assembly 17. Together, the upper and lower hub spring assemblies allow limited movement of the hub assembly 10 with respect to the shaft as known in the art.

Figure 5:
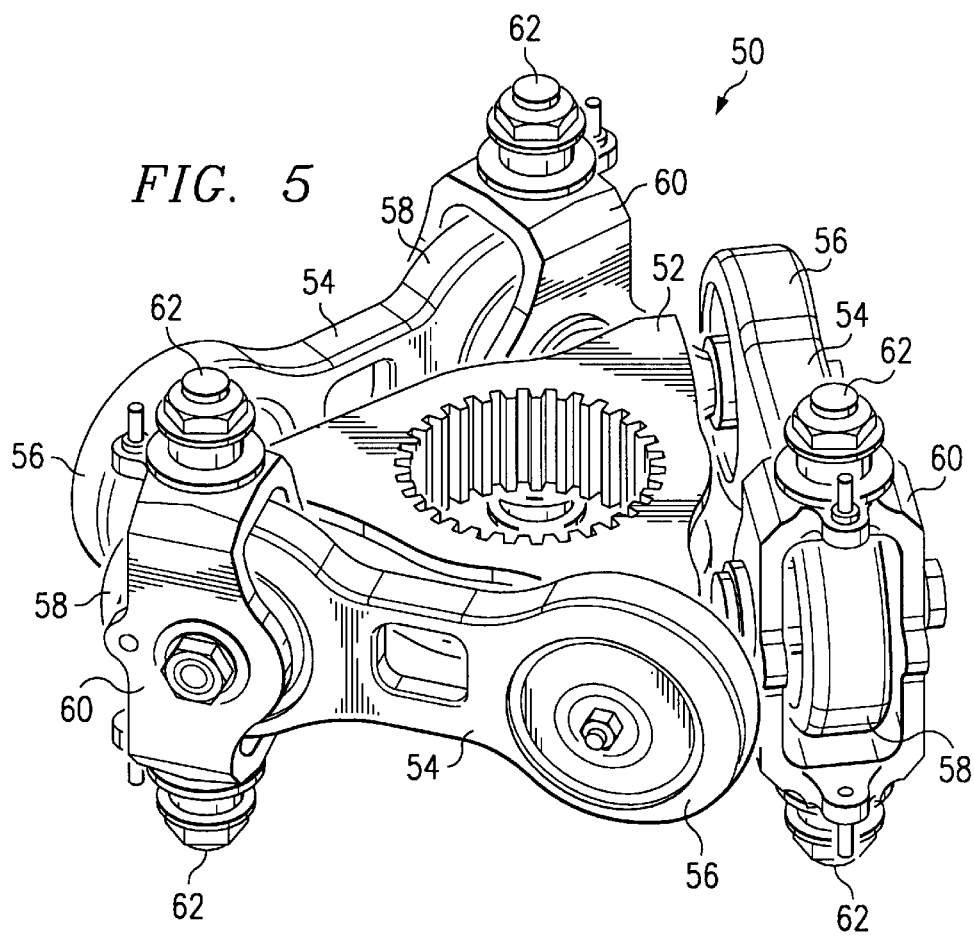
FIG. 5 illustrates a preferred constant velocity joint assembly used with the prop rotor hub assembly.

Referring to FIG. 5, a constant velocity (CV) joint assembly is shown. CV joint assembly 50 includes trunnion 52, which is internally splined to mate with splines on the rotor shaft (not shown). Three drive links 54 are connected at equally spaced intervals around trunnion 52, and provide a constant velocity joint for the hub assembly 10 in combination with trunnion 50. Drive links 54 provide the required degrees of freedom for the yoke 12 and attached blades to flap relative to the rotor shaft. Use of these links is described in detail in U.S. Pat. No. 5,186,686, assigned to Lord Corporation, which is incorporated by reference herein as if set forth in full.

Each link 54 has a first end 56 rotatably coupled to trunnion 52, and a second, free, end 58 rotatably coupled to a pillow block 60. Each pillow block 60 carries two studs 62, which will extend through the appropriate holes in the top and bottom hub plates. Studs 62 will each extend through one set of holes 32 and 44, or the other set of holes, 34 and 46, depending on the orientation of the CV joint 50.

As can be seen in FIG. 5, CV joint 50 is symmetrical about a plane passing through trunnion 52 at an orientation perpendicular to the rotor shaft. By simply flipping CV joint assembly 50 about this plane, pillow block studs 62 will be aligned to match up with one set or the other os the holes in hub plates 14 and 16. CV joint 50 should be oriented so that, as the shaft rotates, first end 56 leads its corresponding free end 58.

Figure 6:
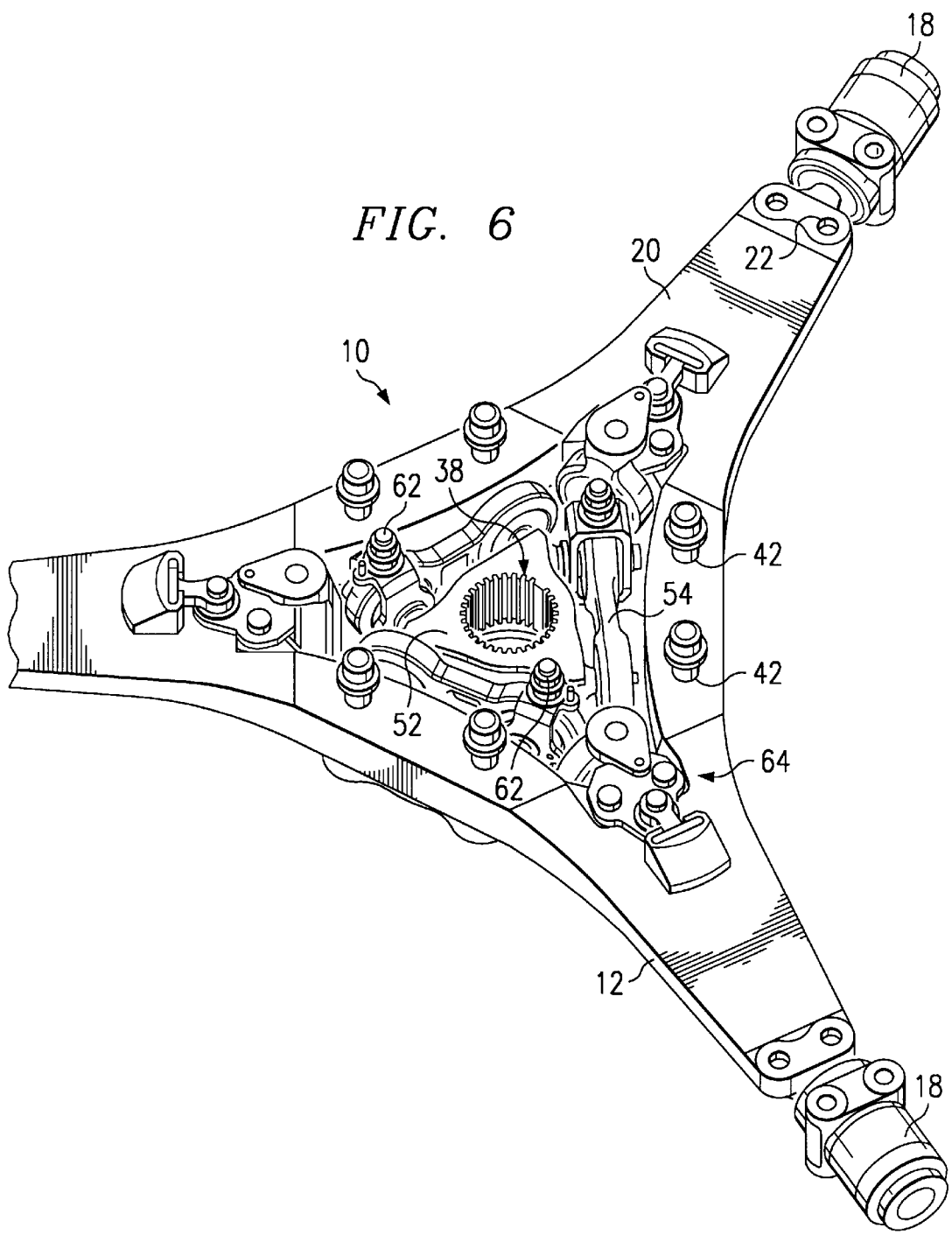
FIG. 6 is a view of the preferred rotor hub assembly with the upper hub spring assembly removed.

FIG. 6 illustrates final assembly of the unit 10, with upper hub plate 14, and its associated spring assembly, removed for clarity. As shown, CV joint assembly 50 rests within opening 26 in the middle of yoke 12. Preferably, CV joint assembly 50 is substantially coplanar with yoke 12. In the preferred embodiment, CV joint 50 is approximately 0.36 inches above the plane of yoke 12, but it will be recognized that the relative locations of CV joint 50 and yoke 12 may change while still using the teachings herein. Shown in FIG. 6 are the previously described elements, assembled except for upper hub plate 14, and additionally shown are inboard anchoring elements 64. Elements 64 are conventionally constructed, and carry chord and beam loads from the blade. Elements 64 are connected only to the yoke 12, and do not make any contact with pillow block assembly 50 or either hub plate 14, 16. The torque path through assembly 10 is as follows: torque is transferred from the shaft through trunnion 52 to the three links 54. It is then transferred from the drive links to the pillow blocks 60, and then to the upper and lower hub plates 14, 16 through pillow block studs 62. Finally, torque is transferred through hub plates 14, 16 to yoke 12 through bolts 42 and their associated bushings. Thus, hub plates 14, 16 are an integral part of the torque transfer path from the shaft to the blades. The hub plates and yoke act as a unit, improving efficiency of torque transfer in the system.

In the preferred embodiment, trunnion 50 is fabricated from high strength stainless steel to provide the required strength for this highly stressed part. The drive links and pillow blocks are formed from titanium, which combines suitable weight with adequate strength and fatigue properties. Upper and lower hub plates can be fabricated from aluminum. Due to their size, hub plates are preferably low weight combined with adequate strength, and aluminum fits this requirement for a light to medium duty tilt rotor aircraft.

The pitch bearings are preferably aluminum with uniball bearings and teflon liners as known in the art. The bolts and bushings used to attach the hub plates to the yoke are preferably high strength steel, while the yoke itself is a fiber composite material. The yoke can be formed using any of several specialized techniques known in the industry. An example of a suitable technology which can be used to form the yoke is described in U.S. Pat. No. 4,293,276, which is hereby incorporated by reference.

The preferred yoke uses three separate sets of fiber belts, wound between two arms for each set. For example, referring back to FIG. 2, one belt set can be wound between the left arm and that toward the lower right as shown in the figure. The belt is wound around hollow posts used to define bolt holes 22. Multiple belts are stacked in sets to obtain the required thickness of the yoke. The preferred embodiment includes 8 belts in each set to result in the desired yoke thickness.

In a preferred embodiment, the rotor shaft is 4 inches in diameter, and each yoke arm 20 is 18 to 24 inches long. Of course, these sizes can be varied as needed to work with any design appropriate for the aircraft being built.

In summary, in improved prop rotor hub assembly has been described which utilizes an in-plane design. The design is substantially symmetrical around a plane passing through the center of the yoke. All of the torque transfer elements, including the described trunnion, drive links, pillow blocks, hub plates, and yoke, are all symmetrical about this plane. As will be appreciated by those skilled in the art, the assembly need not be precisely symmetrical to reap the benefits of the invention.

One feature of the design is the ability to easily adjust the in-plane stiffness of the overall hub assembly by properly locating the bolts which couple the hub plates to the yoke. This allows relatively simple design changes to be implemented as design criteria are changed, and these changes do not require expensive retooling for the yoke. This technique can be used with rotor designs other than that described herein in order to achieve required stiffness within the assembly.

While the invention has been particularly shown and described with reference to a preferred embodiment, it will be understood by those skilled in the art that various changes in form and detail may be made therein without departing from the spirit and scope of the invention.

What is claimed is:

1. An in-plane hub assembly, comprising:
   a planar yoke having a plurality of arms, each arm adapted to hold a rotor blade; and
   upper and lower hub plates coupled to the yoke on opposite sides of the yoke plane, wherein torque transmitted to the hub plates is in turn transmitted to the yoke;
   wherein the yoke is not rigidly mounted directly to a mast.

2. The hub assembly of claim 1, further comprising:
   means for transmitting torque from the mast to the upper and lower hub plates.

3. The hub assembly of claim 2, wherein the torque transmitting means comprises a constant velocity joint connected to the mast and the upper and lower hub plates, wherein the constant velocity joint is substantially symmetrical about the yoke plane.

4. The hub assembly of claim 3, wherein the constant velocity joint comprises:
   a trunnion coupled to the mast;
   a plurality of drive links connected to the trunnion; and
   a pillow block connected to each drive link and to both the upper and lower hub plates.

5. The hub assembly of claim 3, further comprising a hub spring connected to each hub plate and to the mast for allowing movement of the hub plates relative to the mast.

6. The hub assembly of claim 1, wherein the yoke is formed from fiberglass.

7. The hub assembly of claim 1, wherein the hub plates are formed from metal for selectively tuning the overall stiffness of the hub assembly.

8. The hub assembly of claim 1, wherein the hub plates are formed from aluminum for selectively tuning the overall stiffness of the hub assembly.

9. The hub assembly of claim 1, wherein the yoke has three arms equally spaced around a central opening.

10. The hub assembly of claim 1, wherein the upper and lower hub plates are connected together with a plurality of connectors, and wherein the connectors pass through the yoke between each adjacent pair of yoke arms, thereby allowing selective tuning of the stiffness of the hub assembly.

11. The hub assembly of claim 10, wherein at least two connectors are located between each adjacent pair of yoke arms.

12. The hub assembly of claim 11, wherein the connectors between each pair of yoke arms are spaced to provide an overall hub assembly stiffness equal to a predetermined design criterion.

13. An improved hub assembly, comprising:
   a substantially planar yoke having a plurality of arms, each yoke arm adapted to hold a rotor blade, the yoke arms being configured to define a single aperture through the yoke;
   first and second hub plates located on opposite sides of the yoke plane; and
   between each pair of adjacent yoke arms, at least two connector points for connecting the yoke to the hub plates, wherein the connector points are spaced apart to enhance the stiffness of the yoke.

14. The improved hub assembly of claim 13, further comprising:
   a constant velocity joint, located within the yoke plane, for transmitting torque from a mast to the hub plates.

15. The improved hub assembly of claim 13, wherein the connector points are holes drilled through the yoke at locations which enhance the stiffness of the yoke, and wherein the yoke is connected to the hub plates with bolts passing through the holes.

16. The improved hub assembly of claim 13, wherein the yoke is formed from fiberglass.

17. The improved hub assembly of claim 13, wherein the yoke includes an opening through the center which defines a geometry for the yoke which enhances stiffness.

18. The improved hub assembly of claim 17, wherein the opening is generally triangular.

19. An improved hub assembly, comprising:
   a substantially planar yoke having a plurality of arms, each yoke arm adapted to hold a rotor blade, the yoke arms being configured to define a single aperture through the yoke;
   at least one hub plate connected to the yoke; and
   between each pair of adjacent yoke arms, at least two connector points for connecting the yoke to the at least one hub plate, wherein the connector points are spaced apart to enhance the stiffness of the yoke.

* * * * *